United States Patent [19]

Tabei

[11] Patent Number: 4,613,404

[45] Date of Patent: Sep. 23, 1986

[54] MATERIALS WHICH EXHIBIT A SURFACE ACTIVE EFFECT WITH VACUUM BAKED PHOTORESISTS AND METHOD OF USING THE SAME

[75] Inventor: Masatoshi Tabei, Kanagawa, Japan

[73] Assignee: Fuji Photo Film Co., Ltd., Kanagawa, Japan

[21] Appl. No.: 672,326

[22] Filed: Nov. 16, 1984

[51] Int. Cl.$^4$ .......................... C23F 1/02; B44C 1/22; C03C 15/00; C03C 25/06

[52] U.S. Cl. .................... 156/643; 156/644; 156/656; 156/659.1; 204/192.15; 204/192.32; 360/110; 427/131; 430/313; 430/318

[58] Field of Search .......... 156/643, 644, 656, 659.1, 156/661.1; 204/192 EC, 192 E; 360/110, 122, 123; 427/43.1, 88, 91, 127–132, 271, 272; 430/330, 318, 313

[56] References Cited

U.S. PATENT DOCUMENTS 4,218,532  8/1980  Dunkleberger ............. 156/661.1 X
4,224,400  9/1980  Koel et al. ..................... 156/656 X
4,381,966  5/1983  Rasekhi ......................... 156/661.1 X

*Primary Examiner*—William A. Powell
*Attorney, Agent, or Firm*—Sughrue, Mion, Zinn, Macpeak & Seas

[57] ABSTRACT

A process for manufacturing a thin film magnetic head, the improvement wherein a metal, alloy or mixture thereof which improves the surface characteristics of a vacuum baked photoresist is deposited on the vacuum baked photoresist to thereby improve adhesion of a subsequently deposited layer.

9 Claims, 7 Drawing Figures

$$90° > \theta \geq \tan^{-1}\left(\frac{\ell}{d}\right)$$

MATERIALS WHICH EXHIBIT A SURFACE ACTIVE EFFECT WITH VACUUM BAKED PHOTORESISTS AND METHOD OF USING THE SAME

BACKGROUND OF THE INVENTION

1. Field of the Invention

The present invention relates to the use of metal materials which exhibit a surface active effect for vacuum baked photoresists, methods of using the same and, particularly, methods for using the same in the fabrication of thin film magnetic heads.

2. Description of the Prior Art

Applicant is unaware of any directly relevant prior art other than that prior art which deals with general procedures for fabricating thin film magnetic heads. Specifically, no prior art discloses a technique of depositing a metal or alloy, etc., in order to improve photoresist surface characteristics and/or improve electrical contact of a wiring metal to an electrode, major features of the present invention.

SUMMARY OF THE INVENTION

It has been discovered that if a layer is to be applied to a vacuum baked photoresist layer, it is difficult to selectively remove the same with high accuracy.

To solve this problem, it has been discovered that depositing a suitable bonding metal such as a thin noble metal film over the vacuum baked photoresist permits a later deposited layer, e.g., another photoresist layer to be removed with high accuracy and with ease.

One object of the present invention is to provide an improved means of ensuring good contact of a photoresist to a baked photoresist.

Another object is to provide improved electrical contact between an electrode and a wiring metal.

A further object of the present invention is to provide a method for fabricating thin film magnetic heads.

BRIEF DESCRIPTION OF THE DRAWINGS

Unless otherwise indicated, like numerals are used throughout the drawings to identify like elements.

DESCRIPTION OF PREFERRED EMBODIMENTS

As will be apparent to one skilled in the art, the present invention is not limited to the formation of a thin film magnetic head and is of general application wherever layers are to be provided over a baked photoresist. However, since the present invention does find particular application to the production of thin film magnetic heads, the following disclosure is directed to such.

Figure 1:
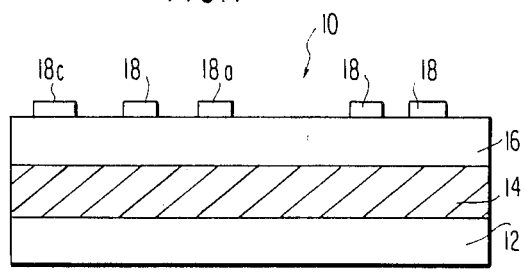
FIG. 1 is a cross sectional view of a thin film magnetic head at initial stages of processing per the present invention taken along line A—A of FIG. 2.
Figure 2:
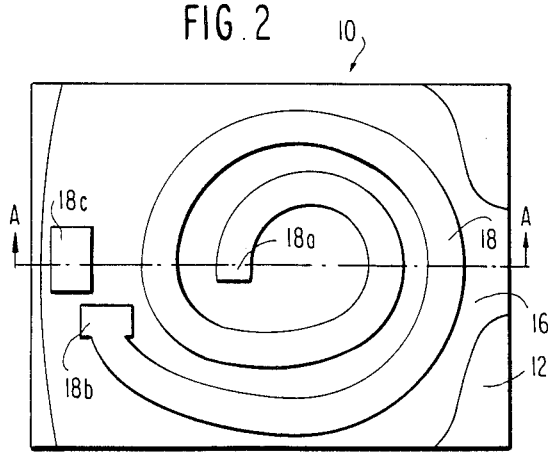
FIG. 2 is an upper view of the thin film magnetic head of FIG. 1.

With reference to FIGS. 1 and 2, in the formation of a thin film magnetic head per the present invention a conventional substrate 12 such as sapphire has formed thereon a layer of permalloy 14 in a conventional manner to a conventional thickness, whereafter an insulation layer of alumina 16 is formed thereon by a conventional technique to a conventional thickness. Typically at this stage the alumina layer 16 is coated with a conventional photoresist which is exposed through an appropriate mask and developed (removed) where alumina layer 16 and then permalloy layer 14 are to be removed in a conventional layer to have the configuration as best seen by numeral 16 in FIG. 2. Thereafter, a layer of copper is formed by a conventional technique to a conventional thickness. The above formation techniques are not to be construed as limitative.

As will be appreciated by one skilled in the art, other substrates, materials other than permalloy, other insulation layers than alumina and materials other than copper can be used with equal success.

After formation of the copper layer, a conventional photoresist is deposited using a conventional masking technique to define the desired copper coil structure and output pad, whereafter the photoresist is exposed, developed and removed in a conventional manner to thereafter permit removal of the copper at all areas except where the coil structure and output pad are desired. After copper removal the photoresist is then completely removed in a conventional manner. Following the above, the thin film magnetic head 10 at this intermediate stage has the structure as shown in FIGS. 1 and 2, FIG. 1 representing a side sectional view of the thin film magnetic head 10 along line A—A at this intermediate stage and FIG. 2 representing an upper view wherein the sapphire layer is shown as 12, the bottom permalloy layer is shown as 14, the alumina layer is shown as 16 and the remaining copper which comprises the coil structure is shown as 18. In FIGS. 1, and 2, 18a represents the inner end of the coil structure, 18b is the outer end or coil termination of the coil structure and 18c *is a copper output pad. As can be seen in FIG. 1, the alumina layer 16 insulates the coil structure 18 from the bottom permalloy layer 14.*

Figure 5:
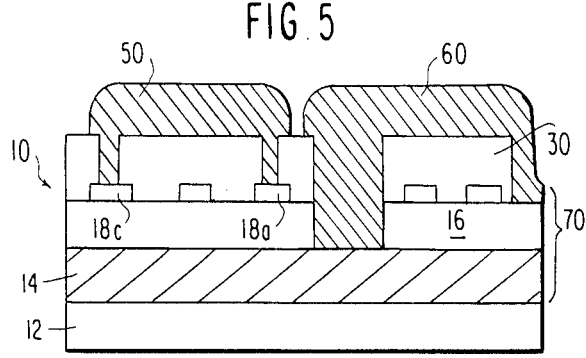
FIG. 5 is a cross sectional view of a thin film magnetic head per the present invention after permalloy deposition taken along line B—B of FIG. 6.
Figure 6:
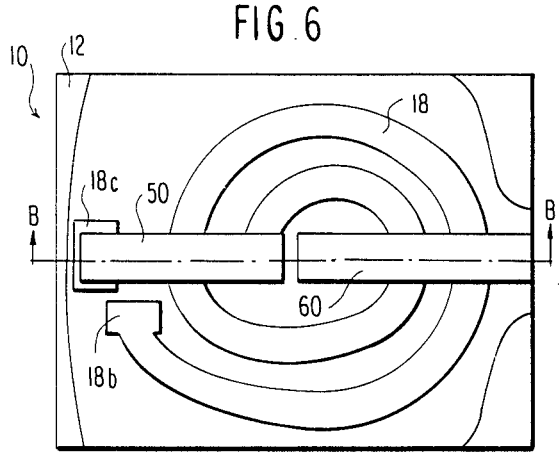
FIG. 6 is a top view of the thin film magnetic head of FIG. 5.

As one skilled in the art will appreciate, there generally will be more turns in the coil structure in practical use, e.g., eight, and the Figures are merely illustrative. The inner end of the coil structure 18a and the output pad 18c will be brought into contact by permalloy bridge connector 50 as shown in FIGS. 5 and 6.

After the copper coil and output pad are formed on the alumina insulator, it is necessary to form a thick insulator over the copper, for example, to a thickness greater than $3\mu$, typically on the order of greater than $3\mu$ to $20\mu$. The reason why such a thick insulator is required is that it is necessary to have good separation between the bottom permalloy layer 14 and the top permalloy layers such as 50 and 60, (best seen in FIG. 5) in the thin film magnetic head to prevent magnetic flux shorting before the pole tip region of the thin film magnetic head which is also best seen in FIG. 5. It is to be noted, in this regard, that insulator 16 accurately maintains the gap between the top and bottom permalloy layers which, of course, acts as the gap width of the magnetic head.

Following the above processing, a positive photoresist is deposited thereon, for example, A.Z. 1375, Shipley Company. Other positive photoresists can also be used. The nature of the photoresist is not overly important nor is the thickness of the photoresist so long as the photoresist exhibits its protective and insulative function. Usually the photoresist is used at a thickness as earlier indicated (greater than $3\mu$ to $20\mu$). When A.Z. 1375 is used, a thickness of $6\mu$ has proven to give good results.

The photoresist is then baked in a conventional manner until the same is cured; typically temperatures on the order of greater than about 300° C. are used, e.g., greater than about 300° to 350° C. are used, for two to four hours, though neither temperatures nor times are limitative. Usually it is most convenient to gradually raise from room temperature (about 25° C.) to a maximum temperature of about 350° C., for example, from room temperature to a maximum temperature of about 350° C. might take about 6–8 hours with the total time at a temperature of greater than about 300° to about 350° C. being about 2–4 hours. Usually it is most convenient just to use a linear temperature elevation from room temperature to the desired baking temperature.

I generally prefer to bake the photoresist under a slight vacuum. The degree of vacuum is not overly important, so long as oxygen is excluded, and typically I use a vacuum on the order of from about 0.01 m Torr to about 200 m Torr.

While not mandatory, before baking the photoresist it is easier to expose and develop the photoresist to remove desired portions thereof through an appropriate mask using conventional techniques; the mask defines the contact area for the coil termination, for the permalloy opening and for an opening near the head tip as will now be explained with respect to FIG. 3.

Figure 3:
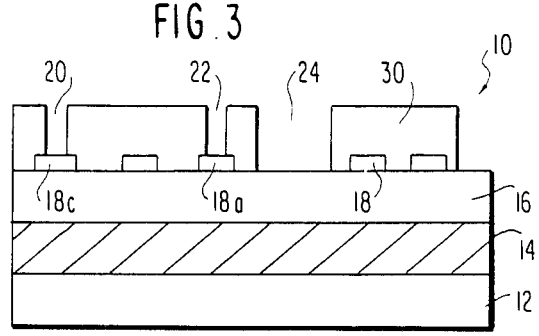
FIG. 3 is a cross sectional view of a thin film magnetic head per the present invention after deposition and selective removal of baked photoresist.

Referring to FIG. 3, which represents the thin film magnetic head 10 at this intermediate stage in processing, the area for the coil termination is shown as 20, the permalloy opening is shown as 22, and the opening near the head tip as shown as 24. The baked photoresist is shown as 30; as will be appreciated by one skilled in the art, during baking the photoresist somewhat shrinks, e.g., to about one half its original thickness. This can easily be taken into account by one skilled in the art using conventional techniques. The baked photoresist serves to insulate the coil structure 18 from the later to be upper formed permalloy bridge connector 50 and the permalloy top 60 of the thin film magnetic head, as best seen in FIG. 5. The baked photoresist areas 30 also serve to electrically separate the right half and the left half of the head tip, as also best seen in FIG. 5.

I attempted to utilize alumina instead of a baked photoresist, but found it extremely difficult to deposit alumina to the desired thickness.

I also attempted to use a polyamide resin instead of a baked photoresist, but I found it much easier to make the desired openings in the baked photoresist for the necessary contact areas, etc., using photolithography with a baked photoresist as opposed to a polyamide.

However, in my work with the baked photoresist, I found several problems.

Firstly, there are subsequent processing stages in the manufacture of thin film magnetic heads which require the application of additional photoresist layers. For reasons which are not quite clear, I found that if an additional photoresist layer(s) is/are attempted to be applied over the baked photoresist, the additional photoresist layer(s) tends to agglomerate, i.e., the same did not have good wetting characteristics with the baked photoresist. I found agglomeration to be unacceptable because all desired areas should be completely covered and, with agglomeration, this was impossible.

I then discovered that by depositing a thin layer of a bonding metal, typically by sputter depositing, e.g., a material which insures good conductivity (good electrical contact between the electrode and wiring metal), the objects of the present invention were achieved. I most prefer to sputter deposit a thin layer of a noble metal, a noble metal alloy, aluminum or an aluminum alloy. The same exhibits an excellent surface active effect with respect to a later deposited photoresist layer(s), and I had no problems in obtaining excellent deposition of the later deposited photoresist layer(s).

With respect to the noble metal alloys used, the exact nature thereof is not unduly limited, though I have found best results with palladium-gold alloys. The noble metals can be freely selected from palladium, gold, platinum, silver, copper and the like. While I exemplify a binary alloy, alloys of three or more components can be used. It is most preferred that the minimum weight percentage of any single noble metal in the alloy be 0.1%, most preferably at least 1%, based on alloy weight (hereafter same basis). Thus, for a binary noble metal alloy, the first component will generally comprise from 1 to 50% of the alloy and the second component will comprise from 99 to 50% of the alloy. With ternery and higher alloys, while I do not contemplate the same at present as offering any substantial benefits over a binary alloy, at least two of the noble metals will each comprise at least about 0.1% of the alloy; with a ternery or a higher alloy, the percentage of the third or higher noble metal component(s) is not overly important and such will generally only be used to obtain desired effects.

If desired, suitable metals for bonding purposes such as aluminum, aluminum alloys, e.g., aluminum-silicon alloys at any proportion, aluminum-silicon-copper alloys for aluminum wiring or nickel-gold or other gold alloys for gold wiring can also be used.

Since it is most preferred to use noble metal alloys per the present invention, the following discussion will largely be in terms of such noble metal alloys. It is to be understood, however, that the present invention is not limited thereto, though noble metal alloys as above described do provide superior results with respect to noble and other metals per se and other alloys.

As will be appreciated by one skilled in the art, the following discussion regarding procedural steps applies with equal force to other metals and other alloys, though it is in the context of noble metal alloys.

It is well known that noble metal alloys do not always deposit evenly. Accordingly, it is necessary per the present invention to deposit to a sufficient thickness to form a continuous layer over the baked photoresist. This thickness is not unduly limited so long as a continuous layer is formed. However, as will be appreciated by one skilled in the art, unduly high thicknesses are undesirable since noble metal alloy cost is increased (unless recovery procedures are used) and sputtering costs are increased. Typically, though this is not limitative, a thin layer on the order of about 100 Å to 500 Å is used. The primary criterion is that the layer of noble metal alloy be continuous; if this limitation is met, the minimum thickness is not overly important, whereas the maximum thickness is determined primarily by process economics. Further, one skilled in the art will appreciate that if the noble metal alloy layer is too thick, since it is used primarily for wetting, extra steps will be necessary to remove the alloy during hole opening steps, a complication obviously undesired.

Sputtering is typically by d.c. magnetic sputtering in a conventional manner. One skilled in the art will easily be able to appreciate that techniques other than d.c. magnetic sputtering can be used.

Sputtering deposition rates do not appear to be overly important and these are of secondary consequence to the process of the present invention and can easily be determined by one skilled in the art. Obviously this primarily depends upon the equipment available and process economics.

Figure 4:
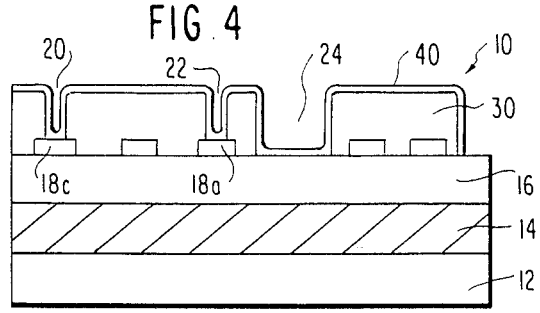
FIG. 4 is a cross sectional view of a thin film magnetic head after deposition of a noble metal alloy per the present invention.

Following deposition of the noble metal alloy, the thin film magnetic head 10 at this intermediate stage of the process has the configuration as shown in FIG. 4 where the noble metal alloy, typically a palladium-gold alloy, is shown by numeral 40.

At this stage I typically deposit the same photoresist as was used to remove the copper layer, etc., and expose via a mask and develop (remove) the photoresist in a conventional manner to expose only the noble metal alloy 40 in the desired permalloy contact area represented by 24 in FIGS. 3 and 4, the photoresist protecting all other areas.

The noble metal alloy 40 is then first removed and then the alumina layer 16 thus exposed is removed in the area of the permalloy contact 24, both by milling (etching). Milling can be done by a number of conventional techniques but typically I utilize an argon ion beam which is introduced into the opening in a conventional manner using a Technic milling machine, whereby the noble metal alloy 40 and the alumina are sputter etched away to expose the permalloy layer 14 in the area of the permalloy contact 24.

It is to be specifically noted, however, that when the contact metal, e.g., noble metal alloy 40, is deposited on the vacuum baked photoresist 30, the vacuum baked photoresist shows improved surface wetting characteristics. While the earlier advanced discussion has often been with respect to improved surface wetting characteristics with respect to another photoresist, and the effects of the present invention are particularly shown with a photoresist, the vacuum baked photoresist 40 shows improved surface wetting characeristics in general due to the deposition of the noble metal (alloy), aluminum (alloy), etc.

One skilled in the art can easily determine appropriate argon ion beam etching conditions in a conventional manner.

Etching is terminated using a conventional end point detector to monitor the optical emission of the sputtered atoms; this is a conventional technique and permits one to easily determine when the bottom permalloy layer 14 is reached to terminate etching.

Remaining photoresist is then removed in a conventional manner.

The noble metal alloy is then typically milled off using the argon ion beam technique above described in a conventional manner insuring, of course, pads 18a and 18c and bottom permalloy layer 14 are not significantly etched.

Typically the noble metal alloy, such as a palladium-gold alloy, is removed during this step by shallow angle milling, that is, the angle of the argon ion beam, which is measured from the normal, is relatively small. This is a conventional technique in the art.

However, it is often advantageous to permit noble metal alloy, e.g., a palladium-gold alloy, to remain on the copper as the same helps bonding between copper and permalloy and between copper and conventional wiring. Thus, in an optional embodiment of the present invention, if desired, deep angle milling in a conventional manner can be utilized to permit noble metal alloy to remain only at any contact area where good contact conductance is desired, while noble metal alloy can be milled off in areas where the same is not desired.

Figure 7:
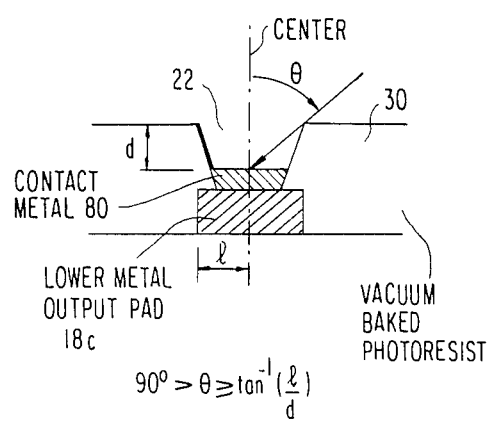
FIG. 7 is a side schematic view illustrating a deep angle milling procedure per the present invention.

The concept of deep angle milling is illustrated in FIG. 7 which illustrates the situation for deep angle milling opening 22 containing output pad 18c where the noble metal alloy contact metal is represented by 80, baked photoresist 30 also being shown.

Normally, following baking of the photoresist to harden the same and deposition of the noble metal alloy, typically by sputtering, the incidence angle of the ion beam is set as $\theta$ and the base is rotated, whereby the noble metal (alloy) or aluminum (alloy), etc., remains over the contact area, whereafter the condition of contacting (electrical conductivity) between the lower metal output pad 18c, shown as exemplary, and wiring metal to be set thereon is improved.

By following the above procedure, not only is the vacuum baked photoresist provided with improved surface wetting characteristics, but contact metal remains at the desired contact portion.

Subsequently, permalloy is deposited using a conventional technique, whereafter a conventional photoresist is applied, exposed through a mask, and developed (removed) in a conventional manner and the device milled in a conventional manner to shape the top permalloy areas 50 and 60 as shown in FIG. 5, whereafter the device has the structure shown in FIG. 5 where numeral 50 represents the permalloy bridge connector and numeral 60 represents the permalloy top of the thin film magnetic head. The permalloy top 60 of the thin film magnetic head is in contact with the lower permalloy layer 14 via the hole which has been etched through alumina layer 16 as shown in FIG. 5. In FIG. 5 the pole tip comprises the area identified by numeral 70, the head gap being defined by the thickness of the alumina layer 16. The present invention is not limited to permalloy for this step, and other materials can be used with success.

The device at this stage is shown in an upper view in FIG. 6.

Not shown in FIG. 6 is conventional wiring connecting the permalloy bridge connector 50 via output pad 18c and coil end 18b to conventional current drivers.

The present invention is not, of course, limited to the use of the photoresists identified above and other conventional photoresists can be used with equal success. For etching steps, photoresist thickness is not important and is as typically used in the art.

Having thus generally described the invention, the following working example is offered.

EXAMPLE

A conventional sapphire substrate about 500 microns thick had deposited thereon a layer of permalloy 3 microns thick by a conventional technique. Thereafter, an insulation layer of alumina 0.35 micron thick was deposited thereon by a conventional technique. Finally, a layer of copper 3 microns thick was formed thereon by a conventional technique.

After formation of the copper layer, the photoresist A.Z. 1375 was deposited thereon to a dry thickness of 3.5μ, exposed through an appropriate mask to define the coil structure and then developed (removed) to expose the copper at all areas where copper was not desired, whereafter the copper was removed in a conventional manner.

After the above procedure, A.Z. 1375 was applied to a thickness of 6μ, exposed through an appropriate mask in a conventional manner and then developed in a conventional manner to leave unprotected the contact area for the coil termination, for the area of the permalloy opening and the area for the opening near the head tip. Following baking at 350° C. for 2-4 hours under a vacuum of 5-100 milli Torr, the A.Z. 1375 layer had a thickness of about 4 μm. The photoresist was linearly raised from room temperature to the desired baking temperature over a total time period of from 6-8 hours and maintained at 350° C. for 2-4 hours.

After the above processing, a layer of palladiumgold alloy (95% palladium, 5% gold, based on alloy weight) was deposited to a thickness of about 200 Å by d.c. magnetic sputtering for about 90 seconds using a plasma current of 10 volts and 10 milliamps.

After the above processing, the same photoresist as was used to remove the copper layer was applied to a thickness of 3.5 μ, and then exposed and developed (removed) in a conventional manner in the area of the permalloy contact area.

The noble metal alloy and then the alumina layer were then removed in the area of the permalloy contact by argon ion beam milling at the following conditions: $\theta = 26°$; acceleration voltage=500v; current density 0.2A/cm$^2$; 70 minutes.

A conventional end point detector was used to determine when etching should be terminated.

After removal of the photoresist, remaining noble metal alloy was then milled off using the argon ion beam technique above described at appropriate conditions.

Permalloy was then deposited to a thickness of 3 μm using the same technique as earlier identified to deposit the first permalloy layer at essentially the same conditions to fill the hole over the contact area for coil termination, the hole over the permalloy opening and the hole over the opening near the head tip and to cover the device.

Following the above, a conventional photoresist (3.5 μm) was applied, exposed and developed (removed) in a conventional manner, whereafter the top permalloy layer was shaped by milling in a conventional fashion, to define the permalloy bridge connector and the permalloy top of the thin film magnetic head.

The above essentially completes all necessary steps for production of a thin film magnetic head per the present invention.

Dimensions of the thin film magnetic head of the present invention are otherwise conventional and in accordance with normal prior art dimensions.

While the invention has been described in detail and with reference to specific embodiments thereof, it will be apparent to one skilled in the art that various changes and modifications can be made therein without departing from the spirit and scope thereof.

What is claimed is:

1. In a process for manufacturing a thin film magnetic head, the improvement wherein a metal, alloy or mixture thereof which improves the surface characteristics of a vacuum baked photoresist is deposited on the vacuum baked photoresist to thereby improve adhesion of a subsequently deposited layer.

2. The process as claimed in claim 1, wherein the subsequently deposited layer is a photoresist layer.

3. The process as claimed in claim 2, wherein the metal, alloy or mixture thereof is selected from the group consisting of a noble metal, a noble metal alloy, aluminum, an aluminum alloy or a mixture thereof.

4. The process as claimed in claim 3, wherein said metal, metal alloy or a mixture thereof is a noble metal alloy.

5. The process as claimed in claim 4, wherein the vacuum baked photoresist has a thickness of greater than about 3μ to about 20μ.

6. The process as claimed in claim 1, wherein, prior to the deposition of the metal, metal alloy or mixture thereof, holes are etched in the vacuum baked photoresist, whereafter the metal, metal alloy or mixture thereof is deposited on the surface of the vacuum baked photoresist and in said holes, whereafter the metal, metal alloy or mixture thereof is removed by deep angle milling, whereby the metal, metal alloy or mixture thereof is permitted to remain in said etched holes.

7. The process according to claim 1, wherein said baking is at a temperature of greater than about 300° C. to about 350° C. for about 2 to about 4 hours.

8. The process claimed in claim 7, wherein said baking is in a vacuum on the order of from about 0.01 m Torr to about 200 m Torr.

9. The process as claimed in claim 1, wherein said metal, metal alloy or mixture thereof is a palladium-gold alloy.

* * * * *